United States Patent [19]

Fujishima et al.

[11] Patent Number: 4,711,741

[45] Date of Patent: Dec. 8, 1987

[54] DISOXIDANT COMPOSITION

[76] Inventors: Daishiro Fujishima; Shinichiro Fujishima, both of 18-12, Asahi-cho, Sagamihara-shi, Kanagawa-ken, Japan

[21] Appl. No.: 718,019

[22] PCT Filed: Jul. 26, 1984

[86] PCT No.: PCT/JP84/00378

§ 371 Date: Mar. 25, 1985

§ 102(e) Date: Mar. 25, 1985

[87] PCT Pub. No.: WO85/00537

PCT Pub. Date: Feb. 14, 1985

[30] Foreign Application Priority Data

Jul. 26, 1983 [JP] Japan ................... 58-136273

[51] Int. Cl.$^4$ ............................................. C09K 3/00
[52] U.S. Cl. ........................... 252/188.28; 252/187.1; 252/187.2; 252/187.23; 252/187.24; 252/187.25; 252/187.26; 252/187.27; 252/187.28; 426/118; 426/133; 502/406; 502/400; 423/219
[58] Field of Search ................... 502/1, 406, 407, 400; 426/118, 133; 423/219; 252/187.1, 187.2, 187.23–187.28, 188.1, 188.28

[56] References Cited

U.S. PATENT DOCUMENTS

| 1,335,949 | 4/1920 | Wilson et al. | 252/192 |
| 2,477,631 | 8/1949 | Levy et al. | 252/187.23 X |
| 2,482,891 | 9/1949 | Aston | 252/187.23 X |
| 3,591,515 | 7/1971 | Lovely | 252/187.23 X |
| 3,669,894 | 6/1972 | Faust | 252/187.28 X |
| 3,967,039 | 6/1976 | Ninane et al. | 252/187.23 X |
| 4,073,741 | 2/1978 | Heintz | 252/187.31 X |
| 4,192,773 | 3/1980 | Yoshikawa et al. | 252/188.28 X |
| 4,406,813 | 9/1983 | Fujishima et al. | 252/188.28 |
| 4,547,381 | 10/1985 | Mason et al. | 252/187.23 X |

FOREIGN PATENT DOCUMENTS 599  3/1982  PCT Int'l Appl. ............ 252/188.28

OTHER PUBLICATIONS

Derwent Abstract No. C85-028528, (3rd Week 1985), "Deoxygenating Agent-...".
Derwent Abstract No. 01256J/47, (47th Week 1982), "Chlorine-Dioxide-...".
Derwent Abstract No. 96006D/52, (52nd Week 1981), "Food Preservative...".

Primary Examiner—Matthew A. Thexton
Attorney, Agent, or Firm—Stephen F. K. Yee

[57] ABSTRACT

A disoxidant comprising, in combination, a metal component having a disoxidation activity and a halogen-containing oxyacid salt as an electrolyte component. Especially, in a case where a chlorite is used as the electrolyte component, there can be provided an excellent disoxidant having both disoxidation and sterilization activities.

10 Claims, No Drawings

DISOXIDANT COMPOSITION

TECHNICAL FIELD

This invention relates to a disoxidant having an excellent reaction activity (disoxidation activity) with atmospheric oxygen.

BACKGROUND ART

It has been hitherto known that metals or metal compounds react with atmospheric oxygen in the presence of water, and various disoxidants utilizing this principle have been proposed. In this case, as the metals or metal compounds, there have been used a wide variety of metals or metal compounds including, for example, iron, copper, manganese, zinc, nickel, aluminum, chromium, ferrosilicon, ferronickel, ferromanganese, iron carbide, iron sulfide, ferrous oxide, ferrous hydroxide, iron carbonyl, silicon iron, ferrous acetate, sodium sulfide, ferrous carbon, and the like. In general, any metals or metal compounds, so long as they are capable of being oxidized, is applicable singly or in the form of a mixture. Such metals or metal compounds, however, are slow in the rate at which they react with atmospheric oxygen and, therefore, are generally used in combination with various electrolytes used as a promoter. In this case, the disoxidation reaction activity of the metals or metal compounds may vary depending upon the kind of electrolytes used therewith. It has generally been believed that halogenated metals exhibit the most excellent disoxidation activity among them, and that oxyacid salts such as sulfates or nitrates are inferior and are not practical in actual use.

DISCLOSURE OF THE INVENTION

According to the present invention, there is provided a disoxidant comprising a metal component with a disoxidation activity and an electrolyte component, characterized in that an halogen-containing oxyacid salt is used as the electrolyte component.

According to the preferred embodiment of the present invention, there is provided a disoxidant having a combined function of both disoxidation activity and disinfection effect, when a chrorite is used as the above halogen-containing oxyacid salt.

Furthermore, according to another preferred embodiment of the present invention, there is provided a disoxidant characterized by the combination of a filler impregnated with the halogen-containing organic acid salt, with the metal component.

The metal component used in the present invention may be various known metals or metal compounds havng a disoxidation activity or an ability to be oxidized and including, for example, iron, copper, manganese, nickel, cobalt, aluminum, chromium, ferrosilicon, ferronickel, ferromanganese, iron carbide, iron sulfide, ferrous oxide, ferrous hydroxide, iron carbonyl, silicon iron, ferrous acetate, sodium sulfide, ferrous carbonate, and the like. These metals or metal compounds may be employed singly or in the form of a mixture.

The feature of the present invention resides in that a halogen-containing oxyacid salt is employed as the electrolyte component which is combined with the metal component. Such a halogen (chlorine, bromine, iodine, etc.)-containing oxyacid salt may be conventional halogenated salts having the general formula $M_1/nYO_m$ wherein M stands for a metal, n is the valence of M, Y stands for a halogen atom, and m is an integer of 1 to 4. Examples of the metals include alkali metals such as sodium and potassium, calcium, zinc, magnesium, iron, aluminum, and the like. The oxyacid salt may be used as ammonium salts, ethanol-amine salts, and so on. Illustrative of suitable halogen-containing oxyacid salts are sodium perchlorate, calcium perchlorate, sodium periodate, sodium chlorate, potassium chlorate, calcium chlorate, sodium bromate, calcium bromate, sodium iodate, potassium iodate, sodium chlorite, potassium chlorite, sodium hypochlorite, potassium hypochlorite, calcium hypochlorite, sodium hypobromite, and the like.

In the present invention, the amount of the halogen-containing oxyacid salt used is not limited to a specific range, but can be generally varied in a range from 0.001 to 100 parts by weight, preferably from 0.01 to 10 parts by weight, based on 100 parts by weight of the metal component. In order to combine the metal component with the halogen-containing oxyacid salt, various conventional methods for producing a metal composite or mixture are applicable. Examples of suitable methods include (1) a method of coating a surface of the metal component with a small amount of the halogen-containing oxyacid salt, (2) a method of mixing the metal component with the halogen-containing oxyacid salt, (3) a method of mixing the metal component, the halogen-containing oxyacid salt and a filler, (4) a method of impregnating a filler with the halogen-containing oxyacid salt and then mixing the filler with the metal component, or the like, as shown in Japanese Laid-open Patent Applications Nos. 56-33980, 56-17633, 52-104489, 56-5132 and so forth.

In a case where the surface of the metal component is coated with the halogen-containing oxyacid salt, it is preferred that the metal component has a grain size of, generally, 10 mesh or finer, especially 50 mesh or finer, in order to accelerate the contact with oxygen. The halogen-containing oxyacid salt may be coated over the surface of the metal component in an amount of 0.001 to 10 parts by weight, preferably 0.01 to 5 parts by weight, based on 100 parts by weight of the metal component. Thus constituted disoxidant can be preferably produced in accordance with the following process. That is, the metal component is mixed and coated with a solution containing the halogen-containing oxyacid salt and, if necessary, adhesives and other constituents, followed by drying of the coated metal component until the water content is reduced to 1% or less. Generally, the solution of the halogen-containing oxyacid salt is an aqueous solution which may contain other solvents, if necessary.

The concentration of the halogen-containing oxyacid salt in the solution may be optionally selected from those below the saturated concentration thereof. The thus obtained disoxidant composed of metal powder, the surface of which is coated with the halogen-containing oxyacid salt, can react with atmospheric oxygen in the presence of water. This disoxidant can be charged into a sealed plastic packing bag together with a food containing water. In this case, water vapor emanated from the food fills the packing bag and then acts on the disoxidant so that the latter is activated to react with molecular oxygen in the packing bag. As a result, the concentration of oxygen in the packing bag can be reduced to 1% or less. Such a disoxidant is rendered quickly effective by using it along with water-containing substances.

In instance where the metal component is directly mixed with the halogen-containing oxyacid salt, it is advantageous that both components are used in the form of fine powder having a small grain size. Suitably, the metal component has a grain size so that at least 50% by weight, preferably at least 80% by weight of the metal component powder can pass through a 150 mesh sieve. The grain size of the halogen-containing oxyacid salt is advantageous such that at least 50% by weight, preferably at least 60% by weight, more preferably 80 to 100% by weight thereof can pass through the 150 mesh sieve. The amount of the halogen-containing oxyacid salt used is not specifically limited but, because both components are in the form of fine powder, it is advantageous that the halogen-containing oxyacid salt be used in such a small amount as ranging from 0.01 to 20 parts by weight, preferably 0.5 to 10 parts by weight per 100 parts by weight of the metal component. Since the mixture in the form of a fine powder of the metal component with the halogen-containing oxyacid salt is excellent in ability to keep the latter deposited on the former, any vibration acting thereon during the manufacture or use thereof, does not cause separation and accumulation of the halogen-containing oxyacid salt fine powder on the top of the mixture.

Accordingly, at a glance, the fine powder mixture looks like homogeneous iron powder rather than a mixture of substances and is maintained unchanged in the physical conditions even if a vibration is given thereto. In this sense, the mixture is also applicable to the disoxidant of a type produced by the above method (1) wherein the metal component is surface-treated with an aqueous solution of a halogen-containing oxyacid salt. For instance, the disoxidant having its metal component activated by the deposition of a halogen-containing oxyacid salt, can readily react with molecular oxygen in the presence of water and, therefore, may be used in sealed plastic packing bags with foods containing water. In this case, water vapor emanated from the foods fills the packing bag and then acts on the disoxydant so that the latter reacts with molecular oxygen. As a result, the concentration of oxygen in the packing bag can be reduced to 1% or less. Moreover, by the combination with water-containing substances, the disoxydant is rendered quickly-effective. That is, when the disoxidant with such water-containing substances is placed within a sealed space, the concentration of oxygen therein can be rapidly decreased to 1% or less due to an effect of water vapor generated from the water-containing substances. The water-containing substances may be optionally selected from those capable of emanating water vapor. Illustrative of suitable water-containing substances are water-added porous substances such as zeolite, sepiolite, loess, kaolin, diatomaceous earth, talc, bentonite, pearlite, China clay, active carbon, silica, alumina, magnesia, silica gel, and the like, or various hydrates having crystal water.

In accordance with the preferred embodiment of the present invention, the disoxidant is composed, in combination, of a metal component and a filler impregnated with a halogen-containing oxyacid salt. The kind of the filler used is not specifically limited but may be selected from various natural or synthetic, inorganic or organic porous substances mentioned above. The filler may be used in the form of powder or granules generally having a particle size of 50 to 200 mesh, though not limited thereto. It is further preferred that the filler be composed of two kinds of powder, that is, fine powder and coarse powder. Suitable fine powder contains at least 50% by weight, preferably 80 to 100% by weight of the powder component that can pass through a 100 to 150 mesh sieve, while suitable coarse powder contains not more than 50% by weight of the powder component that can pass through a 100 mesh sieve, preferably through a 50 mesh sieve. In a certain case, the powder having a particle size of about 2 to 5 mm is usable as the coarse powder.

In manufacturing the disoxidant using the filler composed of fine and coarse powder as described above, an aqueous solution of a halogen-containing oxyacid salt is first added to the coarse powder with which the fine powder is thereafter mixed. A raw material of the fine powder is preferably the same as that of the fine powder, but both constituents may be different in raw material from each other. For instance, zeolite is used for the fine powder, while active carbon for the coarse powder, vice versa.

An aqueous solution of the halogen-containing oxyacid salt may be added to the coarse powder component of the filler in an amount not greater than the saturated amount of water to be absorbed by the mixture of fine and coarse powder components, but it ranges generally from 20 to 90%, preferably 30 to 60%, based on the saturated water amount. As the total water content in the mixture increases, its fluidity becomes lowered and, as a result, the fitness of the mixture to a packing machine becomes worse. Moreover, as the water content approaches the saturated water amount of the mixture, the powder surface is wetted with water, causing individual powder particles of the mixture to adhere to each other.

When such mixture is enclosed in a sealed medicine wrapping paper along with the metal component, the surface of the metal component is covered with water oozed from the mixture, resulting in considerable lowering of the disoxidation activity of the metal component. In the filler mixture, the mixing ratio of fine powder component to coarse powder component is such that the content of the fine powder component is in the range of 10–80% by volume, preferably 30–60% by volume, with the content of the coarse powder component being 90–20% by volume, preferably 70–40% by volume. Such a filler composed of fine and coarse powder, and containing a halogen–containing oxyacid salt shows an improved fluidity and therefore a good adaptability to a packing machine, and is further very effective as a reaction promoter for the metal component. A method of producing a disoxidant wherein the filler composed of fine and coarse powder components are used as a reaction promoter is described in details in Japanese Laid-open Patent Application No. 56-5132.

In the present invention, the amount of the halogen-containing oxyacid salt added to the filler is in the range of genrally 0.01 to 50 g, preferably 0.5 to 5 g per 100 cm$^3$ of the filler, though not limited thereto. In the case where the filler is impregnated with an aqueous solution of a halogen-containing oxyacid salt, the aqueous solution may be added, if desired, with other auxiliary constituents including, for example, other electrolyte such as halogenated metal compounds, drying inhibiters such as glycerin or polyethyleneglycol, and anti-freezing agents such as ethanol or ethyelenglycol. The filler containing a halogen-containing oxyacid salt is used in an amount of 0.1 to 20 parts by weight, preferably 0.5 to 10 parts by weight per one part by weight of the metal component.

According to the present invention, it has been found that the preferred disoxidant can be obtained by using a chlorite as the electrolyte component. That is, the disoxidant constituted by the combination of the metal component with a chlorite, has a sterilization activity in addition to its inherent disoxidation activity, because the chlorite can generate chlorine dioxide with a sterilization power, in the presence of water. It is generally known that disoxidants, when used in a sealed food package, can reduce the oxygen concentration therein to 1% or less, whereby a propagation of aerobic bacteria such as mold is effectively prevented. However, such conventional disoxidants have no effect on prevention of anaerobic bacteria propagation. On the other hand, since chlorine dioxide has a sterilization effect on anaerobic bacteria, it can effectively prevent the growth of the anaerobic bacteria in the packages. Chlorine dioxide exhibits a sterilization effect on aerobic bacteria as well as anaerobic bacteria. Accordingly, the disoxidant of the present invention, which is constituted by, in combination, a metal component and a chlorite, is epoch-making disoxidant having both disoxidation and sterilization activities, and, therefore, is very significant in the field of food industries.

BEST MODE FOR CARRYING OUT THE INVENTION

The present invention is more fully described in the following examples, but is not limited thereby.

EXAMPLE 1

(1) Metal Component:

As the metal component, there was used reduced iron powder 65% of which was able to pass through 150 mesh and 50% of which was able to pass through 200 mesh.

(2) Halogen-Containing Oxyacid Salt:

A halogen-containing oxyacid salt was dissolved in water to prepare a 6% by weight aqueous solution thereof. Twenty parts by weight of the aqueous solution was added to and then homogeneously mixed with each 100 parts by weight of a filler (having a particle diameter of about 0.5 to 1.0 mm and a water content of 8% by weight). Thus obtained filler contained about 1% by weight halogen-containing oxyacid salt and had a water content of about 23% by weight. The filler was found to be free of water adhered over the surface thereof and to exhibit an excellent fluidity.

(3) reactivity Test of Disoxidant:

A medicine wrapping bag (KEPLON No. 1 wrapping paper manufactured by KEPLON K.K.) was charged with 1.5 g of the above iron powder and 4 g of the filler containing the halogen-containing oxyacid salt, and was then sealed at its open part to form a closed bag within which the disoxidant was enclosed. The disoxidant-enclosed bag was placed in a container (plastic bag) with an inner space volume of about 720 cc. After the container was hermetically sealed, the oxygen concentration in the container was measured at predetermined intervals. The results of the measurements are shown in the following table 1.

TABLE 1

| Disoxidant NO. | Halogen-containing Oxyacid Salt | Oxygen Concentration (%) Reaction Time (Hr) | | | |
|---|---|---|---|---|---|
| | | 6 | 12 | 24 | 48 |
| 1 | NaClO | 15.5 | 7.8 | 1.9 | 0.1 |
| 2 | NaClO$_2$ | 12.0 | 0.6 | 0.1 | 0.1 |

TABLE 1-continued

| Disoxidant NO. | Halogen-containing Oxyacid Salt | Oxygen Concentration (%) Reaction Time (Hr) | | | |
|---|---|---|---|---|---|
| | | 6 | 12 | 24 | 48 |
| 3 | NaClO$_3$ | 17.7 | 11.0 | 3.1 | 0.14 |
| 4 | NaClO$_4$ | 17.0 | 10.5 | 5.0 | 0.1 |
| 5 | NaBrO$_3$ | 13.8 | 7.3 | 0.84 | 0.1 |
| 6 | Ca(ClO)$_2$ | 9.6 | 3.4 | 0.4 | 0.1 |

EXAMPLE 2

Two ml of a 30% aqueous solution of sodium chlorite (NaClO$_2$) was added to and then mixed with 100 g of iron powder as employed in Example 1, followed by drying of the mixture. After 1.5 g of the surface-modified iron powder thus obtained was charged into a wrapping bag together with 4 g of granular zeolite containing 23.3% of water, the opening of the bag was closed to form a bag filled with the disoxidant of the present invention. Then, the disoxidant-enclosed bag was placed within a container having an inner space volume of about 720 cc. The container was hermetically sealed for conducting disoxidation tests. The test results indicated that the oxygen concentration in the container was reduced to 8.7% after 6 hours, to 4.5% after 12 hours and to 0.1% after 24 hours.

EXAMPLE 3

By using a coffee mill, sodium chlorite was finely comminuted into fine powder (comprising at least 50% by weight of the powder component that passed through a 150 mesh sieve). After homogeneously mixing 1.6 g of such fine powder with 30 g of iron powder as employed in Example 1, 1.5 g of the mixture and 4 g of granular zeolite with a water content of 23.3% were charged into a medicine wrapping bag. The wrapping bag was closed at its opening to form a sealed bag filled with the disoxidant of the present invention. Then, the disoxidant-enclosed bag was placed within a container with an inner space volume of about 720 cc. The container was hermetically sealed for conducting disoxidation tests. The results of the disoxidant tests revealed that the oxygen concentration in the container was reduced to 4.5% after 6 hours, 0.2% after 12 hours and 0.1% after 24 hours.

EXAMPLE 4

Ten grams of a 6% by weight aqueous solution of sodium chlorite was added to and mixed with 50 g of granular zeolite. Four grams of the mixture and 1.5 g of iron powder were charged into a medicine wrapping bag, which was then closed at its opening to form a disoxidant-enclosed bag A. This disoxidant-enclosed bag A was placed within a plastic container A having an inner space volume of about 720 cc, together with a piece of rice cake (about 40 g), and the container was hermetically sealed.

For the purpose of comparison, 10 g of a 6% aqueous solution of sodium chlorite was added to and mixed with 50 g of granular zeolite. Four grams of the mixture and 1.5 g of iron powder were charged into a medicine wrapping bag, which was then closed at its opening to form a dioxidant-enclosed bag B. This disoxidant-enclosed bag B was placed in the plastic container B of the same type as the container A, together with 4 g of a piece of rice cake in a similar manner to the foregoing disoxidant-enclosed bag A. Thereafter, the container was hermetically sealed.

After 36 hours, the oxygen concentrations in both containers A and B were measured to reveal that the oxygen concentration in each container was reduced to 1% or less; namely, complete disoxidation condition. Then a pin hole was formed in each of the containers A and B, and the resulting container was allowed to stand at room temperature to observe the growth of mold over the surface of the rice cake. As a result, after 4 days, the growth of mold was observed on the rice cake placed in the container B for comparison, and after 7 days, the entire surface of the rice cake was covered with blue mold. In contrast, no mold growth was observed on the rice cake held in the container A even after lapse of one month.

In these cases, oxygen concentrations in both containers A and B were not decreased to below 10% by the provision of the pin hole, and actually the oxygen concetrations were each about 11% even after 3 days.

It is believed from the above that the prevention of mold within the container A is attributed to the effect of a very small amount of chlorine dioxide generated from the chlorite used as a promoter.

INDUSTRIAL APPLICABILITY

In accordance with the present invention, there is provided a disoxidant having a cosiderably enhanced disoxidation activity by the combination of a metal component with a halogen-containing oxyacid salt as an electrolyte component (promoter). Especially, in the event that a chlorite is used as the electrolyte component, there is obtained a disoxidant having a sterilization activity in addition to the inherent disoxidation activity, which is therefore extremely useful in the field of foods.

We claim:

1. A disoxidant composition comprising, in combination, a metal component selected from the group consisting of iron, iron carbide and mixtures thereof possessing a disoxidation activity, and an electrolyte component comprising a halogen-containing oxyacid salt selected from the group consisting of sodium chlorite and calcium hypochlorite.

2. The disoxidant of claim 1 wherein said electrolyte component comprises sodium chlorite.

3. The disoxidant of claim 1 wherein said electrolyte component comprises calcium hypochlorite.

4. The disoxidant of claim 1 wherein said electrolyte component is present in an amount in the range of from 0.001 to 100 parts by weight based on 100 parts by weight of the metal component.

5. The disoxidant of claim 1 wherein said electrolyte component is present in an amount in the range of from 0.01 to 10 parts by weight based on 100 parts by weight of the metal component.

6. The disoxidant of claim 1 in the form of a filler material impregnated with the metal component and the electrolyte component.

7. The disoxidant of claim 1 in the form of said metal component having a coating of said electrolyte component.

8. The disoxidant of claim 1 wherein said metal component is in the form of particulates.

9. The disoxidant of claim 8 wherein said particulates are of a size of 10 mesh and finer.

10. The disoxidant of claim 1 wherein both the metal component and the electrolyte are in the form of particulates.

* * * * *